No. 751,901. PATENTED FEB. 9, 1904.
H. A. CUMMINGS.
BRIDLE BIT.
APPLICATION FILED JUNE 25, 1903.
NO MODEL.
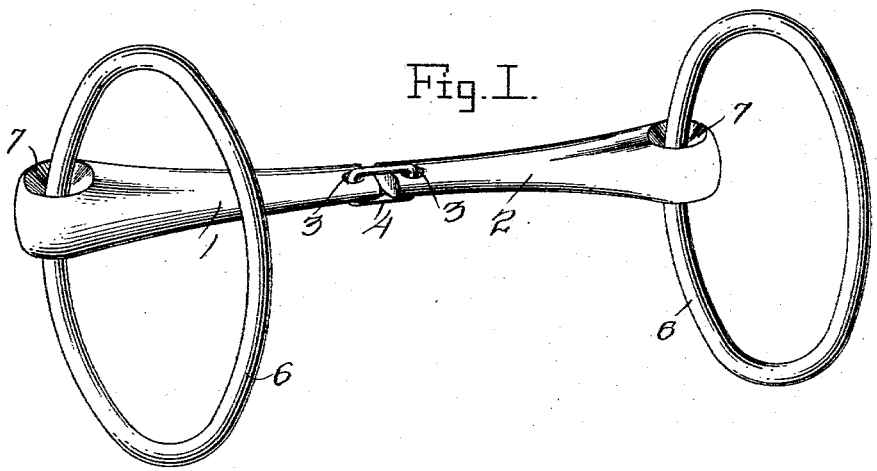
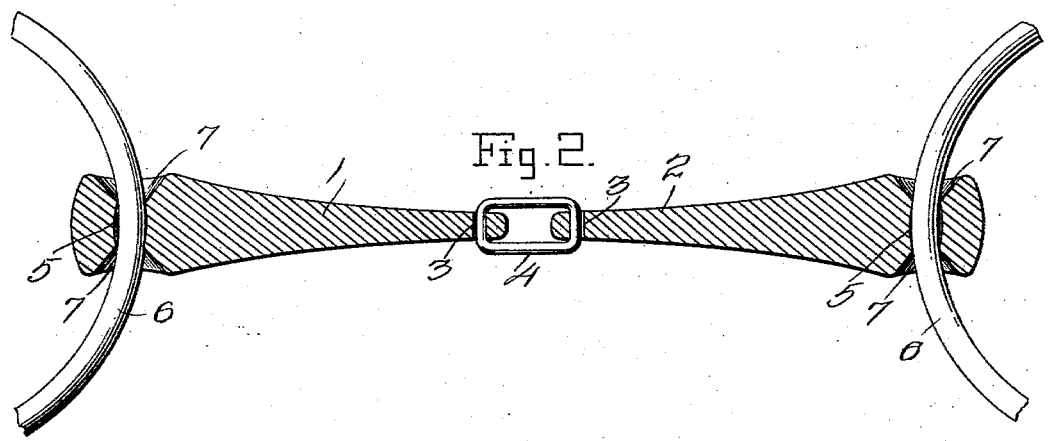
Witnesses
Inventor
Harry A. Cummings
By H. B. Wilson.
Attorney No. 751,901.  
Patented February 9, 1904.

UNITED STATES PATENT OFFICE.

HARRY ALONZO CUMMINGS, OF DEL PASO, CALIFORNIA.

BRIDLE-BIT.

SPECIFICATION forming part of Letters Patent No. 751,901, dated February 9, 1904.

Application filed June 25, 1903. Serial No. 163,027. (No model.)

*To all whom it may concern:*

Be it known that I, HARRY ALONZO CUMMINGS, a citizen of the United States, residing at Del Paso, in the county of Sacramento and State of California, have invented certain new and useful Improvements in Bridle-Bits; and I do declare the following to be a full, clear, and exact description of the invention, such as will enable others skilled in the art to which it appertains to make and use the same.

My invention relates to certain new and useful improvements in bridle-bits which are particularly adapted for use upon race-horses.

The object of the invention is to improve and simplify the construction of devices of this character and to render them less liable to pinch or injure the mouth of a horse.

With this and other objects in view the invention consists of certain novel features of construction, combination, and arrangement of parts, as will be more fully described, and particularly pointed out in the appended claim.

In the drawings, Figure 1 is a perspective view of my improved bit. Fig. 2 is a longitudinal sectional view through the same.

Referring more particularly to the drawings, the numerals 1 and 2 denote the two parts or bars of the mouthpiece of the bit. Said bars are round or circular in cross-section and tapered, the small ends of the same being formed with transverse apertures or openings 3, in which the ends of a connecting-link 4 are engaged. Said link may be oval in shape or S-shaped, as shown in the drawings, and loosely connects the bars or parts of the mouthpiece. In the large and outer ends of the bars 1 and 2 are circular apertures 5, which are slightly curved lengthwise to conform to the curve of a rein link or ring 6, which is engaged with them. Circular concave recesses or cavities 7 are formed at each end of the apertures in the large end of the bars, said cavities serving to permit the rings 6 to turn freely and prevent the mouth or lips of a horse from being caught or pinched between the rings and the bars.

The use and operation of my invention will be readily understood from the foregoing description, and it will be seen that the bit cannot in any way injure the mouth of a horse. When the bit is gently worked from one side to the other while in the mouth of a horse, the effect will tend to calm a fretful or nervous horse without injuring his mouth, and it will be impossible to pinch his lips between the rein-rings and the mouthpiece.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

A bit having a bar provided at its outer end with a transverse opening, and a ring in said opening, the latter being countersunk at its ends, and enlarged inwardly from said countersinks to its center and having its sides curved on a radius equal to that of the ring.

In testimony whereof I have hereunto set my hand in presence of two subscribing witnesses.

HARRY ALONZO CUMMINGS.

Witnesses:
 A. VAN ALSTINE,
 A. HEISEN.